(12) United States Patent
Heine

(10) Patent No.: US 6,398,104 B2
(45) Date of Patent: Jun. 4, 2002

(54) APPARATUS AND METHOD FOR INERTING A WAVE SOLDERING INSTALLATION

(75) Inventor: Fernand Heine, Dusseldorf (DE)

(73) Assignee: L'Air Liquide Societe Anonyme a Directoire et Conseil de Surveillance pour l'Etude et l'Exploitation des Procedes Georges Claude, Paris (FR)

( * ) Notice: Subject to any disclaimer, the term of this patent is extended or adjusted under 35 U.S.C. 154(b) by 0 days.

(21) Appl. No.: 09/771,984

(22) Filed: Jan. 30, 2001

Related U.S. Application Data

(62) Division of application No. 09/249,552, filed on Feb. 12, 1999, now Pat. No. 6,234,380.

(30) Foreign Application Priority Data

Oct. 29, 1998 (DE) .......................... 198 49 946

(51) Int. Cl.⁷ .......................... B23K 31/02; B23K 35/38
(52) U.S. Cl. ...................................... 228/260; 228/219
(58) Field of Search ................................ 228/260, 219

(56) References Cited

U.S. PATENT DOCUMENTS

| | | | |
|---|---|---|---|
| 3,705,457 A | 12/1972 | Tardoskegyi | |
| 5,044,542 A | 9/1991 | Deambrosio | |
| 5,121,874 A | 6/1992 | Deambrosio et al. | |
| 5,203,489 A | 4/1993 | Gileta et al. | |
| 5,240,169 A | 8/1993 | Gileta | |
| 5,358,167 A | * 10/1994 | Tachibana et al. | .......... 219/388 |
| 5,361,969 A | 11/1994 | Gileta | |
| 5,397,049 A | 3/1995 | Gileta et al. | |
| 5,409,159 A | 4/1995 | Connors et al. | |
| 5,411,200 A | 5/1995 | Connors et al. | |
| 5,520,320 A | 5/1996 | McKean et al. | |
| 5,568,894 A | 10/1996 | Gileta | |
| 5,725,143 A | 3/1998 | Leturmy | |
| 5,769,305 A | 6/1998 | Takeda et al. | |
| 6,116,491 A | * 9/2000 | Katoh | .......... 228/219 |

FOREIGN PATENT DOCUMENTS

| | | |
|---|---|---|
| DE | 2 063 284 | 12/1970 |
| EP | 0 854 001 | 7/1998 |
| WO | WO92/10323 | 6/1992 |
| WO | WO95/19864 | 7/1995 |

\* cited by examiner

*Primary Examiner*—Tom Dunn
*Assistant Examiner*—Zidia Pittman
(74) *Attorney, Agent, or Firm*—Burns, Doane, Swecker & Mathis, L.L.P.

(57) ABSTRACT

Provided is a method of operating an apparatus for inerting a wave soldering installation having a solder bath and a conveying system for producing one or more solder waves comprising an immersion box which is closed on all sides, shaped like a frame, can be immersed in the solder bath and which has porous pipes to distribute nitrogen, the pipes being arranged inside the immersion box in housings being designed such that the porous pipes are arranged therein in such a way that the porous pipes essentially cannot be struck by solder splashes produced during the operation of the wave soldering installation. The method includes supplying the inert gas at a temperature far below the temperature of the solder.

22 Claims, 1 Drawing Sheet

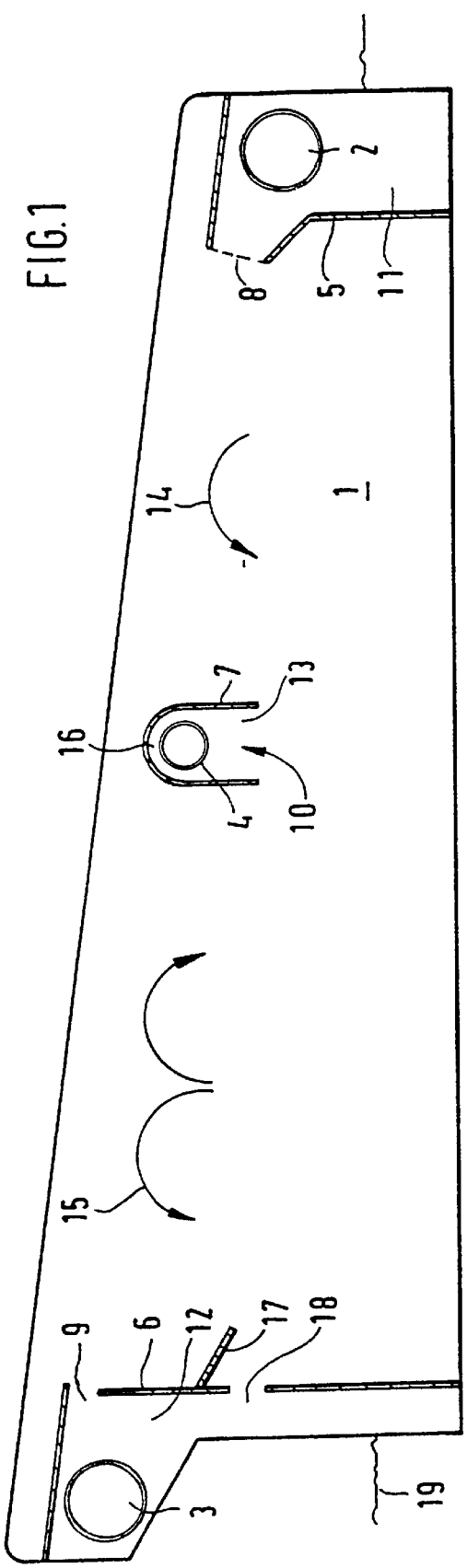
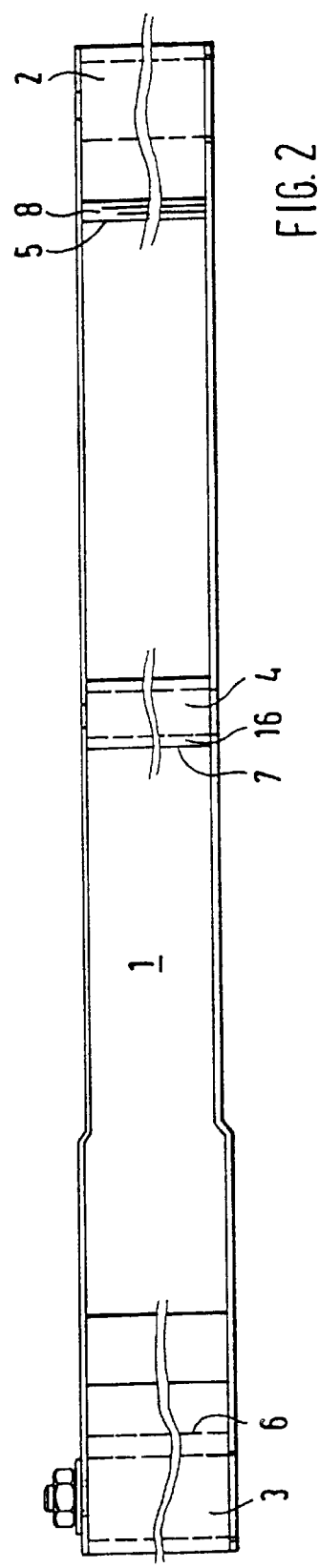

APPARATUS AND METHOD FOR INERTING A WAVE SOLDERING INSTALLATION

This application is a divisional of application Ser. No. 09/249,552, filed Feb. 12, 1999, now U.S. Pat. No. 6,234,380.

BACKGROUND OF THE INVENTION

1. Field of the Invention

The present invention relates to an apparatus and method for inerting a wave soldering installation having a solder bath and a conveying system for producing one or more solder waves, such as is used, in particular, for soldering electric printed circuit boards.

2. Description of the Related Art

Wave soldering installations for soldering printed circuit boards are known, for example from U.S. Pat. No. 5,121,874. In the case of the system described there, the inerting of the atmosphere over the solder bath is achieved by an elongated, closed covering, within which the printed circuit boards to be soldered are transported and in which an inert atmosphere, generally nitrogen, is maintained. In the vicinity of the solder waves which are produced by the wave soldering installation during operation, there are porous pipes which run parallel to the waves and through which inert gas emerges, so that a particularly low-oxygen atmosphere can be achieved, in particular underneath the printed circuit board to be soldered.

In addition, U.S. Pat. No. 5,411,200 and U.S. Pat. No. 5,409,159 disclose the practice of surrounding distribution pipes for inert gas above the solder bath of a wave soldering installation with cage-like housings, which allow the inert gas to emerge through numerous outlet openings. In those documents, a description is also given of the possibility of operating such a wave soldering installation with only a short covering hood or even without a covering hood, by producing a very low-oxygen atmosphere underneath the printed circuit boards by means of skillful distribution of the inert gas above the solder bath during the passage of printed circuit boards to be soldered, and even in the state when no printed circuit board is passing through, by producing a protective layer of inert gas over the solder bath and the solder waves.

In addition, U.S. Pat. No. 5,361,969 also discloses the practice of designing an apparatus for inerting a wave soldering installation as an immersion box which is closed at the sides and in which pipes for distributing inert gas are mounted.

However, in the case of a wave soldering installation, three different operating states may occur, specifically standstill of the installation (that is to say pumps switched off and, accordingly, solder waves not present), installation operation without a printed circuit board passing through and installation operation with a printed circuit board passing through. For all three states, it is necessary to ensure that little oxygen gets to the surface of the solder bath and the solder waves. In addition, when a printed circuit board is passing through, it must be ensured that a particularly inert atmosphere with only very low proportions of oxygen of less than 10 ppm can be maintained underneath this printed circuit board, where the soldering process is intended to take place, since otherwise the quality of the soldered joints becomes poorer. In addition, it is intended that such an installation should be operated for as long as possible without maintenance and should be as easy as possible to maintain. It is precisely on this point that the known installations have weaknesses, since, for example, splashes of solder, which are always produced during the operation of a wave soldering installation, can strike the distributor pipes for nitrogen and block these up over the course of time. This is critical in particular when the distributor pipes used are porous pipes with very fine pores.

SUMMARY AND OBJECTS OF THE INVENTION

The object of the present invention is therefore the provision of an apparatus which permits the inerting of a wave soldering installation under all operating conditions, with or even without a covering hood, and which is designed to require little maintenance and to be easy to maintain. In addition, suitable methods for operating such an apparatus are to be.

In order to achieve this object, the present invention provides both an apparatus according to claim 1 and methods according. Advantageous and preferred refinements of the apparatus are also specified.

BRIEF DESCRIPTION OF THE DRAWINGS

FIG. 1 shows a schematic longitudinal section through an apparatus according to the invention; and FIG. 2 shows a view from above of the apparatus according to FIG. 1.

An apparatus according to the invention for inerting a wave soldering installation having a solder bath and a conveying system for producing one or more solder waves, in particular for soldering electric printed circuit boards, has an immersion box, which is closed on all sides, shaped like a frame, can be immersed in the solder bath and has porous pipes to distribute nitrogen, the pipes being arranged inside the immersion box in cage-like housings with outlet openings, the cage-like housings being designed such that the porous pipes are arranged therein in such a way that the porous pipes can essentially not be struck by solder splashes produced during the operation of the wave soldering installation. According to the invention, the cage-like housings around the porous pipes are used not only to distribute the nitrogen into the desired regions but in particular also to protect the porous pipes which effect a uniform distribution of the nitrogen within their housing. As distinct from the prior art, the cage-like housings are configured not only from the point of view of the arrangement of their outlet openings but also from the point of view of the possibility of preventing splashes of solder, entering through the outlet openings, getting to the porous pipes.

A particularly suitable arrangement for outlet openings has proven to be an arrangement of outlet openings which are directed only to the sides and/or downwards. Since the most important objective of all the arrangements for inerting has always been to achieve an atmosphere with the lowest possible oxygen content underneath the printed circuit board during soldering, outlet openings were mostly also directed upwards against the circuit board. In addition, outlet openings were arranged in the inlet region and in the outlet region of the arrangement, and were intended to prevent the penetration of oxygen, in particular in the case of installations without a large-area inertized covering. Surprisingly, however, outlet openings that are directed to the sides and/or downwards are sufficient to ensure that the wave soldering installation is inertized under all operating conditions. If no printed circuit board to be soldered is present, then in the case of this embodiment inert gas flows uniformly over the solder surface. If a printed circuit board is present, then the inert gas can in any case escape only in the inlet region and in the outlet region of the printed circuit board, underneath the latter, so that the displacement of oxygen is in any case ensured there. The arrangement of outlet openings according to the invention permits these to be arranged such that there is no straight-line connection from the surface of the solder bath and the solder waves through the outlet openings to the porous pipes, which means that the probability that the porous pipes can be struck by solder splashes is considerably reduced.

As an alternative or supplementary measure, the porous pipes can be arranged decentrally inside their cage-like housings, being arranged further from the respective outlet openings than from those walls of the cage-like housings which lie opposite the outlet openings. This also reduces the striking probability of solder splashes, without meaning disadvantages for the distribution of the inert gas.

For any solder splashes which nevertheless penetrate through the outlet openings, it is beneficial if the splashes can run off downwards into the solder bath through an intermediate space, within the cage-like housings, which is open at the bottom. For this purpose, it is also particularly advantageous if all the walls of the cage-like housings have an inclination with respect to the horizontal, so that solder splashes striking the walls on the inside can run off downwards, without striking the porous pipes. In particular, it is also impossible for any solder splashes to run along the walls above the porous pipe and then to drop onto the pipes.

In particular for an arrangement without any covering which can be inerted, it is beneficial if a first porous pipe is arranged on the inlet side of the apparatus, parallel to the solder wave, and a second porous pipe is arranged on the opposite, outlet side.

If the wave soldering installation has two or more solder waves, then, according to the invention, a further porous pipe is preferably arranged between each two solder waves and parallel to these, the cage-like housing of the pipe being curved in a semicircular cross section above the further porous pipe and being led down at the sides as far as below the pipe, there being at least one outlet opening only below the porous pipe. In this way, the porous pipe can virtually not be struck at all by solder splashes, but permits inert gas to flow out precisely where it is needed, specifically into the region of the flank of the solder wave. At those points where the solder wave flows back into the solder bath, turbulence may be produced, which is a particularly critical point for oxidation of the surface of the solder bath. Reliable inerting of this region is achieved by means of the arrangement according to the invention.

For solder waves which are located physically very close beside one another, the further porous pipe is selected to have a smaller cross section than the other porous pipes, and is provided with a cage-like housing that is located closely over it, so that there is a gap of 1 to 3 mm between this housing and the porous pipe, through which gap the inert gas can flow uniformly. This arrangement is particularly compact and, in the case where the porous pipe and the housing are suspended on the side walls of the immersion box, does not require any interfering built-in fittings in the region in which the solder waves flow back into the solder bath.

Use is preferably made, for the present invention, of porous pipes having a mean pore size of 0.3 to 2 $\mu$m, in particular 0.4 to 0.6 $\mu$m. In general, porous pipes made of sintered metal are used, which have an expansion coefficient which is similar to that of the metallic immersion box, so that fastening to the walls of the immersion box is relatively simply possible. As a result of the reduced striking probability for solder splashes on the sintered metal pipes, according to the invention, it is also possible for very fine-pored pipes to remain in use without maintenance for a long time, and after that can easily be replaced by being mounted simply in the immersion box. Fine-pored pipes permit a very uniform distribution of the inert gas within the cage-like housings, a very uniform flow of the inert gas through the outlet openings being produced, which is a precondition for good inerting of the solder bath surface, even when there is no printed circuit board present.

According to another aspect of the present invention, which is intended in particular to be suitable for wave soldering installations without an inerted covering hood, at least one guide plate is additionally fastened to a cage-like housing in regions of turbulence in the solder bath or in regions in which solder splashes are to be expected to an increased extent, the guide plate being able to deflect solder splashes downwards and to reduce turbulence as a solder wave is flowing back into the solder bath. It is particularly preferred for there to be an additional outlet opening for inert gas underneath such a guide plate, so that the turbulent region underneath the guide plate is covered particularly well by inert gas.

As already mentioned, in the case of the present invention it is particularly important to achieve good inerting even in operating states in which there is no printed circuit board present above the wave soldering installation. This is assisted if the outlet openings are configured so as to have a relatively large area and, as a result of their shape and arrangement, bring about a very uniform flow over the surfaces of solder bath and solder wave.

It is particularly beneficial for the operation of the apparatus according to the invention if a greater flow of inert gas is led through the second porous pipe at the outlet side of the apparatus than through each of the other porous pipes. Typically, in the case of a wave soldering installation, the printed circuit boards are guided so that they rise slightly with respect to the horizontal, with the result that, in the outlet region, there is a greater distance between solder bath and printed circuit board or the upper edge of the immersion box than at the inlet side. In addition, there is in this region, because of a solder wave that is present there, a region of increased turbulence, which is covered, for example, with a guide plate. An additional inert gas flow in this region is therefore useful in order to configure the inerting to be as beneficial as possible in this region as well.

It is particularly advantageous to supply the apparatus according to the invention with nitrogen at a temperature far below the temperature of the solder bath, preferably 100 to 400 K below the temperature of the solder bath. In particular, nitrogen can be supplied at an ambient temperature of about 20° C. This nitrogen initially occupies a low volume as it is supplied and as it emerges from the outlet openings, by which means low outflow velocities and hence a very uniform to laminar flow are achieved. However, the nitrogen warms up in the region of the immersion box above the solder bath, as a result of which its volume becomes significantly greater. As a result, it fills the entire system very uniformly and escapes to the sides and upwards and/or below the printed circuit board, at the sides of the latter, with a greater volume flow. This process may be somewhat less beneficial in energetic terms than supplying preheated nitrogen or nitrogen at the temperature of the solder bath, but leads to very good inerting. Since the porous pipes are not likely to be struck by solder splashes, it is also not a disadvantage that these pipes are at a lower temperature, so that solder splashes could stick to them.

An exemplary embodiment of the invention, but to which the latter is not restricted, is described in more detail below with reference to the drawing, in which:

The present exemplary embodiment relates to an overall arrangement of a wave soldering installation, such as is described, for example, in the abovementioned U.S. Pat. No. 5,411,200 or 5,409,159, to which reference is made fully here to this extent. The present invention is concerned here only with the attachment to such an installation in order to inert the surfaces. FIG. 1 shows a longitudinal section in schematic form through the apparatus according to the invention. Mounted in an immersion box 1, which is closed at the sides, are a first porous pipe 2, a second porous pipe 3 and a further porous pipe 4. These pipes are in each case arranged within cage-like housings 5, 6, 7, these housings having outlet openings 8, 9, 10. The porous pipes 2, 3, 4 are not arranged centrally or symmetrically in the cage-like housings 5, 6, 7; instead they have the greatest possible spacing from the respective outlet opening 8, 9 or 10.

The entire immersion box is placed onto a wave soldering installation, part of the immersion box dipping into the solder bath 19, to be specific to such a depth that, even in the event of fluctuations in the level in the solder bath, no gap can develop through which ambient air could penetrate. During the operation of the wave soldering installation, solder waves 14, 15 are located at the points indicated schematically in FIG. 1. The outlet openings 8, 9, 10 and the arrangement of the porous pipes 2, 3, 4 in the cage-like housings 5, 6, 7 are selected such that splashes of solder have only a very low probability of being able to strike the porous pipes 2, 3, 4. In particular, there is no straight connecting line from the solder bath 19 or the solder waves 14, 15 through the outlet openings 8, 9, 10 to the porous pipes 2, 3, 4. Any solder splashes nevertheless penetrating through the outlet openings 8, 9, 10 can flow off towards the solder bath via intermediate spaces 11, 12, 13 which are open at the bottom, this being assisted by the fact that all the walls of the cage-like housings 5, 6, 7 run at an angle, in particular at such an angle that no solder can drop onto the porous pipes 2, 3, 4. This is also assisted by the fact that the cage-like housings have no openings on the upper side. For reasons of space, it is often not possible to arrange, between two solder waves 14, 15, a porous pipe with a cage-like housing whose walls reach down into the solder bath 19. According to the present invention, therefore, a further porous pipe 4, preferably one having a smaller cross section than the remaining porous pipes 2, 3, is arranged at such a point, the said further porous pipe 4 being surrounded by a housing 7 which is curved into a semicircle above the further porous pipe 4 and is led further down at the sides than the cross section of the porous pipe 4. Produced in this way is at least one outlet opening 10, which is directed downwards and at the same time, by means of an intermediate space 13 that is open at the bottom, is so far removed from the further porous pipe 4 that solder splashes cannot reach as far as this pipe but, if necessary, can run off downwards. A gap 16 with a width of 1 to 3 mm is located between the further porous pipe 4 and its cage-like housing 10. The porous pipes themselves are preferably produced from sintered metal and have a pore size between 0.3 and 2 $\mu$m, preferably 0.4 to 0.6 $\mu$m.

In regions of increased turbulence in the solder bath 19, that is to say, in the present example, where the solder wave 15 flows back into the solder bath 19 again, according to the invention a guide plate 17 is preferably arranged on the cage-like housing 6 of the second porous pipe 3. This guide plate 17 reduces turbulence and deflects solder splashes downwards, at the same time leading inert gas, which emerges from an outlet opening 18 underneath the guide plate 17, into the region of the turbulence and thus protecting the surface particularly effectively against oxidation at that point. The outlet openings 8, 9, 10 are configured in such a way that they produce a very uniform nitrogen flow in the direction of the interior of the immersion box 1 and/or along the solder waves 14, 15. This is assisted if nitrogen at ambient temperature or in any case at a temperature far below the temperature of the solder bath 19 is introduced as. the inert gas. The volume of the nitrogen is then still relatively low when it is introduced, which favors uniform flows without turbulence, the nitrogen then heating up above the solder bath and emerging upwards or to the side with a greater volume. As a result, in the case where a printed circuit board is present, ambient oxygen is reliably kept away from the region of the printed circuit board which is to be soldered. If there is no printed circuit. board above the immersion box 1, the entire interior of the immersion box nevertheless remains very largely inerted, specifically both during the operation of the solder pumps and when they are stopped.

A further view from above of the immersion box is illustrated schematically in FIG. 2.

The present invention is suitable, in particular, for compact installations without an inerted covering, and enables the soldering of printed circuit boards with high quality with very long service times of the installation and simple maintenance.

I claim:

1. Method of operating an apparatus for inerting a wave soldering installation having a solder bath and a conveying system for producing one or more solder waves comprising an immersion box which is closed on all sides. shaped like a frame, can be immersed in the solder bath and which has porous pipes to distribute nitrogen, said pipes being arranged inside the immersion box in housings being designed such that the porous pipes are arranged therein in such a way that the porous pipes essentially cannot be struck by solder splashes produced during the operation of the wave soldering installation, and wherein at least a first porous pipe is arranged on an inlet side of the apparatus which lies parallel to a solder wave generated during the soldering treatment, and a second porous pipe is arranged on an opposite, outlet side, in each case in an upper region of the immersion box, the method comprising flowing said inert gas through the second porous pipe on the outlet side at a low rate which is greater than that through each of the remaining porous pipes.

2. Method according to claim 1, wherein the wave soldering is for electric printed circuit boards.

3. Method according to claim 1, wherein said inert gas is nitrogen.

4. Method of operating an immersion box apparatus adapted for placement into a wave soldering installation for an article comprising a plurality of porous pipes for distribution of an inert gas, a housing around each of said porous pipes which includes an outlet opening which is disposed so as to (1) direct the inert gas so as to reduce the oxygen content under the article during soldering treatment and (2) protect said porous pipes from solder splashes during operation of the installation, the process comprising supplying the inert gas at a temperature far below the temperature of the solder.

5. Method according to claim 4, wherein the outlet openings are directed only downwardly and/or sideways.

6. Method according to claim 4, wherein the porous pipes are arranged decentrally inside their housings.

7. Method according to claim 6, wherein the porous pipes are arranged further from the outlet opening of the housing than from a wall of the housing opposite to the outlet opening.

8. Method according to claim 4, wherein the apparatus further comprises, between the outlet openings and the porous pipes, an intermediate space which is open at the bottom of the housings and which permits solder splashes to run off downwardly.

9. Method according to claim 4, wherein the housings comprise inside walls which are inclined with respect to the horizontal, so that solder splashes striking the walls on the inside can run off downwardly, without striking the porous pipes.

10. Method according to claim 4, wherein at least a first porous pipe is arranged on an inlet side of the apparatus which lies parallel to a solder wave generated during the soldering treatment, and a second porous pipe is arranged on an opposite, outlet side, in each case in an upper region of the immersion box.

11. Method according to claim 10, wherein said wave soldering installation generates at least two solder waves, said apparatus further comprising a further porous pipe arranged parallel to and between each of the two solder waves.

12. Method according to claim 11, the further porous pipe having a smaller cross section than the first and second porous pipes.

13. Method according to claim 11, wherein there is a gap of 1 to 3 mm between the inside of the housing and the further porous pipe.

14. Method according to claim 11, wherein said housing is curved in a semicircular cross section above the further porous pipe, includes sides being led down as far as below the further porous pipe and includes at least one outlet opening only below the further porous pipe.

15. Method according to claim 4, wherein the porous pipes have a mean pore size of 0.3 to 2 $\mu$m.

16. Method according to claim 15, wherein the porous pipes have a mean pore size of 0.4 to 0.6 $\mu$m.

17. Method according to claim 4, wherein the apparatus further comprises at least one guide plate fastened to the housing in regions of turbulence in the solder and/or in regions in which solder splashes are to be expected to an increased extent.

18. Method according to claim 17, wherein the apparatus further comprises at least one outlet opening for the inert gas underneath the guide plate.

19. Method according to claim 4, wherein all the outlet openings are configured such that the most uniform inert gas flow with low turbulence is produced.

20. Method according to claim 4, wherein said inert gas is nitrogen.

21. Method according to claim 4, wherein said temperature of the inert gas is 100 to 400° K. below the temperature of the solder.

22. Method according to claim 4, wherein said temperature of the inert gas is about 20° C.

* * * * *